(12) United States Patent
Abdul Jabbar

(10) Patent No.: US 11,870,054 B2
(45) Date of Patent: Jan. 9, 2024

(54) SOLID-STATE LITHIUM BATTERIES INCORPORATING LITHIUM MICROSPHERES

(71) Applicant: Nissan North America, Inc., Franklin, TN (US)

(72) Inventor: Mohammed Hussain Abdul Jabbar, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 357 days.

(21) Appl. No.: 16/916,865

(22) Filed: Jun. 30, 2020

(65) Prior Publication Data

US 2021/0408529 A1 Dec. 30, 2021

(51) Int. Cl.
*H01M 4/134* (2010.01)
*H01M 4/36* (2006.01)
*H01M 10/0562* (2010.01)
*H01M 10/0525* (2010.01)
*H01M 50/431* (2021.01)
*H01M 50/449* (2021.01)
*H01M 4/02* (2006.01)

(52) U.S. Cl.
CPC ........... *H01M 4/134* (2013.01); *H01M 4/366* (2013.01); *H01M 10/0525* (2013.01); *H01M 10/0562* (2013.01); *H01M 50/431* (2021.01); *H01M 50/449* (2021.01); *H01M 2004/027* (2013.01); *H01M 2300/0071* (2013.01)

(58) Field of Classification Search
None
See application file for complete search history.

(56) References Cited

U.S. PATENT DOCUMENTS

| | | |
|---|---|---|
| 5,162,178 A | 11/1992 | Ohsawa et al. |
| 8,323,815 B2 | 12/2012 | Beard |
| 8,557,445 B2 | 10/2013 | Tsuchida et al. |
| 8,778,543 B2 | 7/2014 | Shinohara et al. |
| 8,865,345 B1 | 10/2014 | Ramasubramanian et al. |
| 10,490,796 B2 | 11/2019 | Laramie et al. |
| 2013/0209873 A1* | 8/2013 | Nagasaka ......... H01M 10/0562 429/209 |

(Continued)

FOREIGN PATENT DOCUMENTS

| | | |
|---|---|---|
| CN | 101803071 A | 8/2010 |
| WO | 2009061013 A1 | 5/2009 |

*Primary Examiner* — Laura Weiner
(74) *Attorney, Agent, or Firm* — Young Basile Hanlon & MacFarlane, P.C.

(57) ABSTRACT

A solid-state battery cell includes a cathode, an anode comprising microspheres of lithium metal embedded in an ion and electron conducting oxide-based material, with individual microspheres having a first solid electrolyte interface, and a first solid electrolyte layer comprising a sulfide-based solid electrolyte, the first electrolyte layer positioned between the cathode and the anode. The solid-state battery can also include a second solid electrolyte layer comprising an oxide-based solid electrolyte between the first solid electrolyte layer and the anode, the second solid electrolyte layer having a lower conductivity than the first solid electrolyte layer, and a second solid electrolyte interface between the first solid electrolyte layer and the second solid electrolyte layer.

17 Claims, 5 Drawing Sheets

(56) References Cited

U.S. PATENT DOCUMENTS

2016/0204427 A1* 7/2016 Vereecken ............ H01M 4/366
                                                     429/162
2016/0261002 A1   9/2016  Trevey et al.
2016/0329539 A1  11/2016  Kawaji et al.
2019/0267666 A1* 8/2019  Shin ..................... H01M 4/366

* cited by examiner

US 11,870,054 B2

SOLID-STATE LITHIUM BATTERIES INCORPORATING LITHIUM MICROSPHERES

TECHNICAL FIELD

This disclosure relates to solid-state lithium batteries incorporating dendrite prevention methods, and in particular, the use of lithium microspheres and/or a solid electrolyte interfacial layer between different electrolytes.

BACKGROUND

Lithium metal solid-state batteries offer higher volumetric and gravimetric energy densities than conventional lithium ion batteries. However, non-uniform electrodeposition of lithium, which results in dendrites, is holding back the widespread adoption of lithium metal batteries. During battery operation, lithium is continuously deposited or removed depending on charge/discharge cycles. As the lithium is deposited, it may not deposit uniformly, forming dendrites, which are tiny, rigid branch-like structures and needle-like projections. The formation of dendrites results in a non-uniform lithium surface which further exasperates non-uniform lithium deposition. As the dendrites grow from this non-uniform deposition, battery deterioration can occur as the lithium dendrites reach the other electrode, short circuiting the battery.

SUMMARY

Disclosed herein are implementations of a solid-state battery cell and batteries having multiple solid-state battery cells. One implementation of a solid-state battery cell as disclosed herein includes a cathode, an anode comprising microspheres of lithium metal embedded in an ion and electron conducting oxide-based material, with individual microspheres having a first solid electrolyte interface, and a first solid electrolyte layer comprising a sulfide-based solid electrolyte, the first electrolyte layer positioned between the cathode and the anode.

Another implementation of a solid-state battery cell as disclosed herein comprises a cathode; an anode comprising microspheres of lithium metal embedded in an ion and electron conducting oxide-based material, with individual microspheres having a first solid electrolyte interface; a first solid electrolyte layer comprising a sulfide-based solid electrolyte, the first electrolyte layer positioned between the cathode and the anode; a second solid electrolyte layer comprising an oxide-based solid electrolyte between the first solid electrolyte layer and the anode, the second solid electrolyte layer having a lower conductivity than the first solid electrolyte layer; and a second solid electrolyte interface between the first solid electrolyte layer and the second solid electrolyte layer.

A diameter of each micro sphere can be between 0.5 micron and 4 microns.

The ion and electron conducting oxide-based material can be $LiNbO_3$.

The sulfide-based solid electrolyte can be $Li_{10}GeP_2S_{12}$ (LGPS) and the oxide-based solid electrolyte can be $Li_{6.4}La_3Zr_{1.4}Ta_{0.6}O_{12}$ (LLZTO), also sometimes regarded as $Li_{6.5}La_3Zr_{1.5}Ta_{0.5}O_{12}$ and $Li_{6.75}La_3Zr_{1.75}Ta_{0.25}O_{12}$.

The microspheres can be sized such that a size gradient is formed, the size gradient decreasing through the anode toward the first solid electrolyte layer.

The size gradient can include microspheres having a diameter of between 0.5 micron and 2 microns, and microspheres having a diameter of between 3 microns and 4 microns.

The anode can further comprise a lithium metal layer on a surface of the anode opposite the second solid electrolyte layer, the lithium metal layer having a modified surface such that a majority of the modified surface is oblique to an in-plane direction, the modified surface coated with the first solid electrolyte interface. The microspheres can be positioned between the lithium metal layer and the second solid electrolyte layer and sized such that a size gradient is formed, the size gradient decreasing through the anode toward the second solid electrolyte layer.

Another implementation of a solid-state battery cell as disclosed herein comprises a cathode; an anode comprising a three-dimensional scaffold of lithium metal embedded in an ion and electron conducting oxide-based material, with surfaces of the three-dimensional scaffold having a first solid electrolyte interface; a first solid electrolyte layer comprising a sulfide-based solid electrolyte, the first electrolyte layer positioned between the cathode and the anode; a second solid electrolyte layer comprising an oxide-based solid electrolyte between the first solid electrolyte layer and the anode, the second solid electrolyte layer having a lower conductivity than the first solid electrolyte layer; and a second solid electrolyte interface between the first solid electrolyte layer and the second solid electrolyte layer.

Other implementations and aspects are described herein and otherwise contemplated.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Lithium metal batteries have a higher energy density than conventional lithium ion batteries. During battery operation, lithium is continuously deposited and removed. However, as the lithium is deposited, it may not deposit uniformly, forming dendrites. The formation of dendrites results in a non-uniform lithium surface which further exasperates non-uniform lithium deposition. As the dendrites grow from this non-uniform deposition, battery deterioration can occur as the lithium dendrites extend into the electrolyte and reach the other electrode, short circuiting the battery.

Disclosed herein are embodiments of solid-state battery cells that are designed to limit or prevent dendrite growth by modifying the anode and the electrolyte design. The introduction of lithium metal in the form of microspheres in a solid electrolyte assists in reducing and redistributing the dendrite growth due in part to the shape and the localized solid electrolyte interface (SEI) formed on each microsphere. Introduction of a layered electrolyte, with a layer of an oxide-based lithium-ion conductor and a layer of a sulfide-based lithium-ion conductor provides an SEI between the layers, defending against dendrite penetration.

Figure 1:
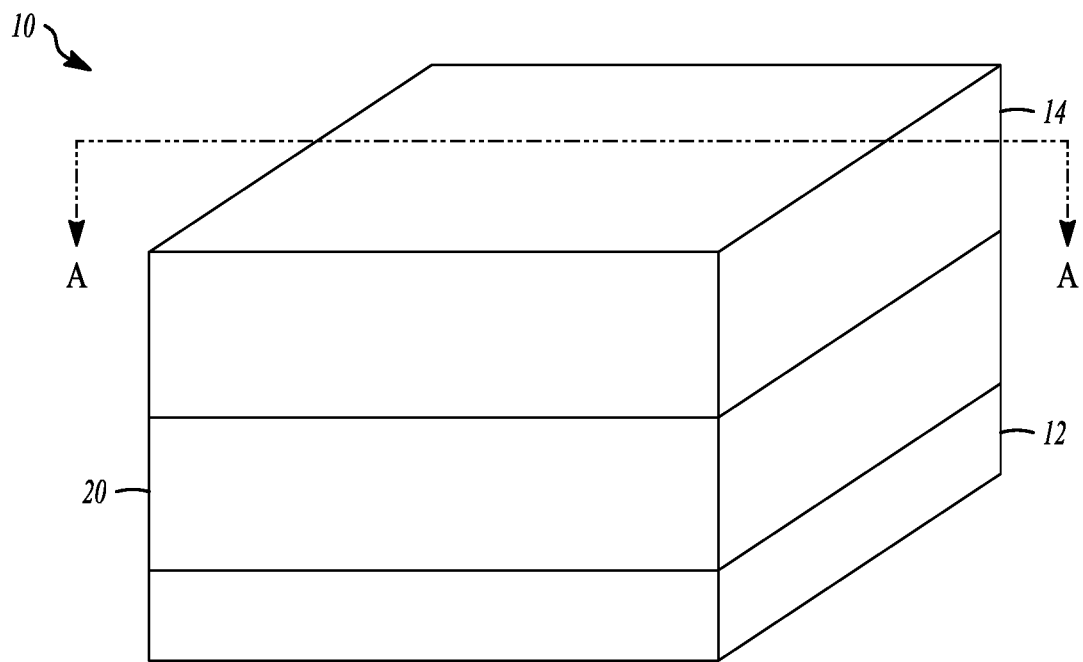
FIG. 1 is a perspective view of an embodiment of a solid-state battery cell as disclosed herein.
Figure 2:
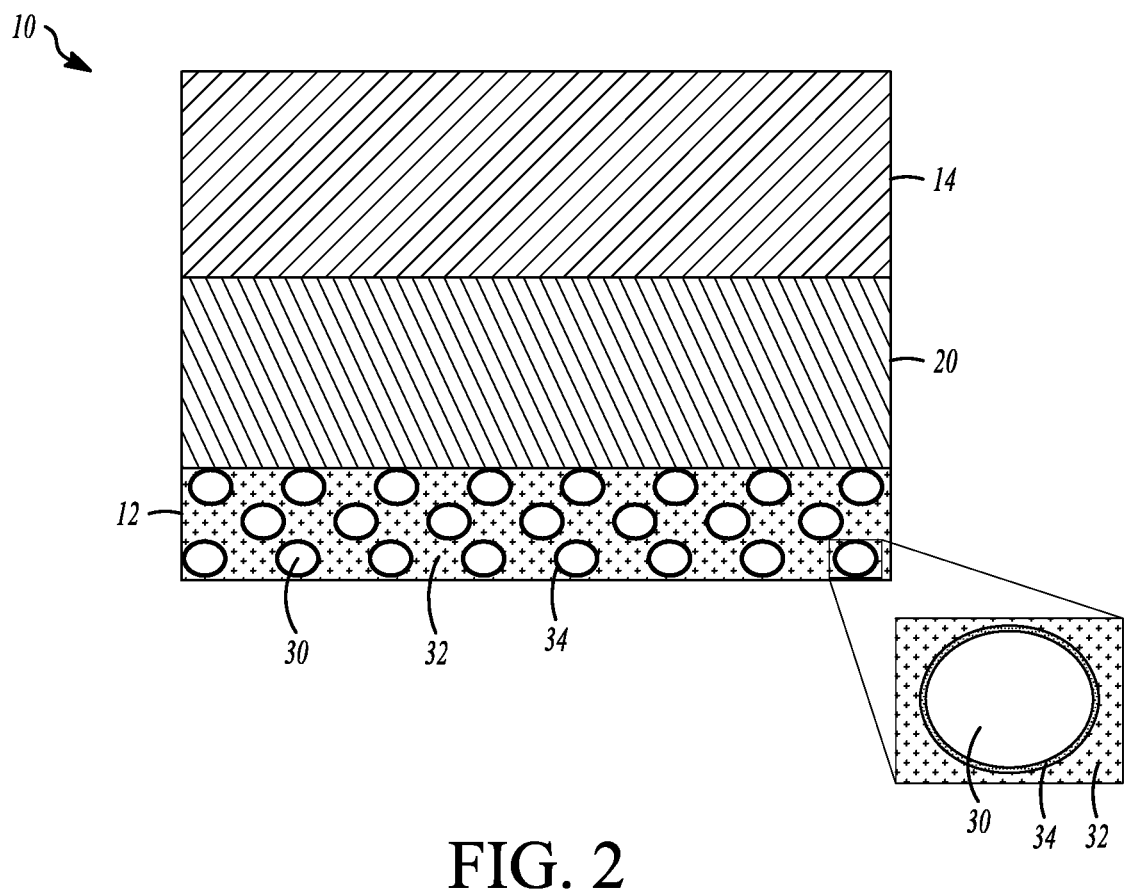
FIG. 2 is a cross-sectional view of the embodiment of the solid-state battery cell of FIG. 1 along line A.

FIG. 1 illustrates a solid-state battery cell 10 as disclosed herein. The solid-state battery cell 10 includes an anode 12, a cathode 14 and a first solid electrolyte layer 20. FIG. 2 is a cross-sectional view of the solid-state battery cell 10 of FIG. 1 along line A. The solid-state battery cell includes the cathode 14, which comprises a cathode active material. The cathode active material comprises one or more electrochemically active cathode materials known for use in solid-state batteries, such as lithium-containing oxide (e.g., lithium cobalt oxide ($LiCoO_2$), lithium manganese oxide ($LiMnO_2$), lithium nickel manganese cobalt oxide (LiNMC), lithium vanadium oxide ($LiVO_2$), lithium chromium oxide ($LiCrO_2$), lithium nickel oxide ($LiNiO_2$), lithium nickel cobalt aluminum oxide ($LiNiCoAlO_2$), and other transition metal oxides, or lithium iron phosphate ($LiFePO_4$)) and other similar materials. The cathode active material can also include one or both of a carbon material for electron conductivity and solid-state electrolyte. As a non-limiting example, the cathode active material can be a mixture of carbon, Li-NMC and a solid-state electrolyte.

The first solid electrolyte layer 20 comprises a sulfide-based solid electrolyte. The first solid electrolyte layer 20 is positioned between the cathode 14 and the anode 12. The sulfide-based solid electrolyte is a sulfide-based ionic conductor, including, but not limited to, $Li_7P_3S_{11}$ (LPS), $Li_{10}GeP_2S_{12}$ (LGPS), $Li_{11}Si_2PS_{12}$, and $Li_{9.54}Si_{1.74}P_{1.44}S_{11.7}Cl_{0.3}$.

The anode 12 comprises microspheres 30 of lithium metal embedded in an ion and electron conducting oxide-based material 32, with individual microspheres 30 having a first solid electrolyte interface 34. The ion and electron conducting oxide-based material 32 can be a lithium niobium oxide ($LiNbO_3$, for example). The first solid electrolyte interface 34 forms on the surface of the microspheres 30 due to reaction between the lithium and the oxygen in the oxide-based material 32 surrounding each microsphere 30. The microspheres 30 should be embedded in the oxide-based material 32 such that individual microspheres 30 do not contact other microspheres. A diameter of each microsphere can be between 0.5 micron and 4 microns. This enables the first solid electrolyte interface 34 to form on the entire exposed surface of each microsphere 30. Conventional anodes are strips of lithium metal. As the battery cell cycles, the lithium metal forms dendrites, that grow up to the electrolyte layer, and ultimately into and through the electrolyte layer. The microsphere 30 shape and size assists in reducing dendrite growth toward the electrolyte layer, as the multi-directional surfaces spread out dendrite growth in all directions, with the majority of dendrite growth directed away from the electrolyte layer. The first solid electrolyte interface 34 passivates the lithium metal of the microspheres and has been found to assist in the reduction of dendrite growth from the lithium metal source.

Figure 3:
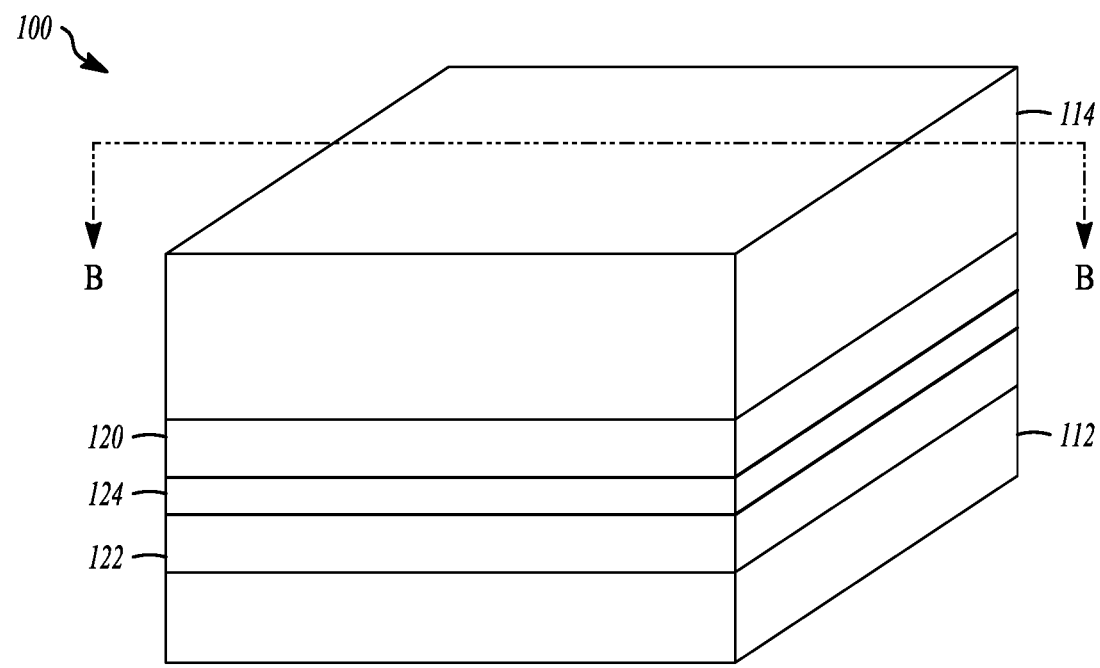
FIG. 3 is a perspective view of another embodiment of a solid-state battery cell as disclosed herein.
Figure 4:
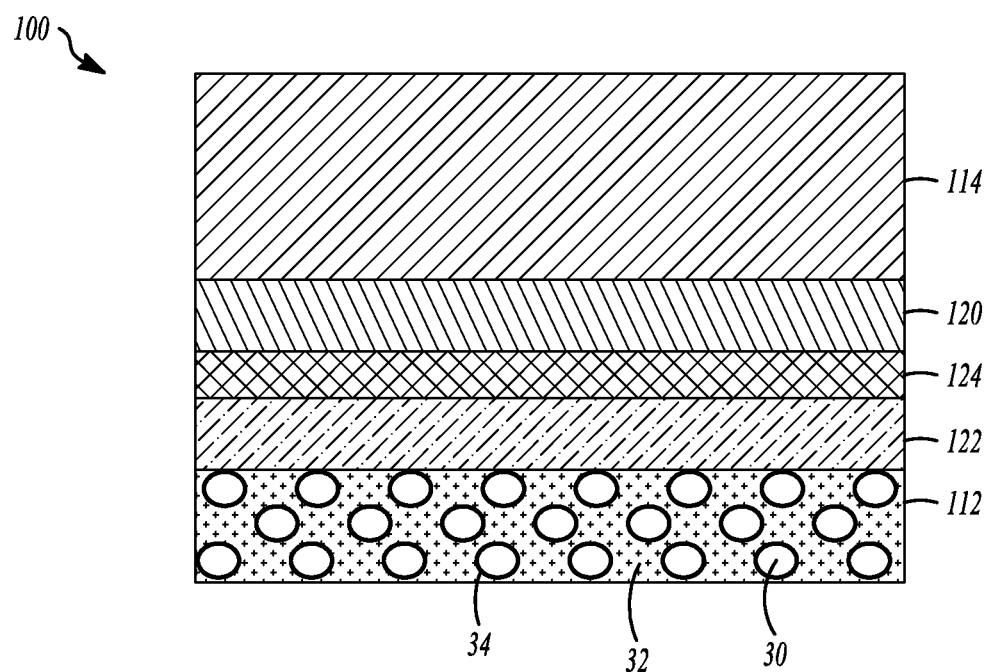
FIG. 4 is a cross-sectional view of the embodiment of the solid-state battery cell of FIG. 3 along line B.

FIG. 3 illustrates another solid-state battery cell 100 as disclosed herein. The solid-state battery cell 100 includes an anode 120, a cathode 114, a first solid electrolyte layer 120, a second solid electrolyte layer 122 and a second solid electrolyte interface 124. FIG. 4 is a cross-sectional view of the solid-state battery cell 101 of FIG. 3 along line B. The cathode 114 is the same as cathode 14 described with respect to FIG. 2 and will not be separately described. The anode 120 is the same as the anode 12 described with respect to FIG. 2 and will not be separately described.

The first solid electrolyte layer 120 comprises a sulfide-based solid electrolyte. The first solid electrolyte layer 120 is positioned adjacent the cathode 114. The sulfide-based solid electrolyte is a sulfide-based ionic conductor, including, but not limited to, $Li_7P_3S_{11}$ (LPS), $Li_{10}GeP_2S_{12}$ (LGPS), $Li_{11}Si_2PS_{12}$, and $Li_{9.54}Si_{1.74}P_{1.44}S_{11.7}Cl_{0.3}$.

The second solid electrolyte layer 122 comprising an oxide-based solid electrolyte between the first solid electrolyte layer 120 and the anode 120. The second solid electrolyte layer 122 has a lower conductivity than the first solid electrolyte layer 120. The oxide-based solid electrolyte is an oxide-based lithium ion conductor such as, but not limited to, $Li_{6.4}La_3Zr_{1.4}Ta_{0.6}O_{12}$ (LLZTO), also sometimes regarded as $Li_{6.5}La_3Zr_{1.5}Ta_{0.5}O_{12}$ and $Li_{6.75}La_3Zr_{1.75}Ta_{0.25}O_{12}$.

The second solid electrolyte interface 124 is formed between the first solid electrolyte layer 120 and the second solid electrolyte layer 122 due to the oxide in the second solid electrolyte layer 122 and the sulfide in the first solid electrolyte layer 120. The second solid electrolyte interface 124 acts as a wall, reducing or preventing dendrite growth through the second solid electrolyte interface 124 and into the first solid electrolyte layer 120. The combination of the shaped lithium metal in the anode 120, the first solid electrolyte interface 34 around the lithium microspheres 30, the lower conductivity of the second solid electrolyte layer 122, and the second solid electrolyte interface 124 achieve significant reduction in dendrite growth through the electrolyte and into the cathode, improving performance and extending the life of the battery.

Figure 5:
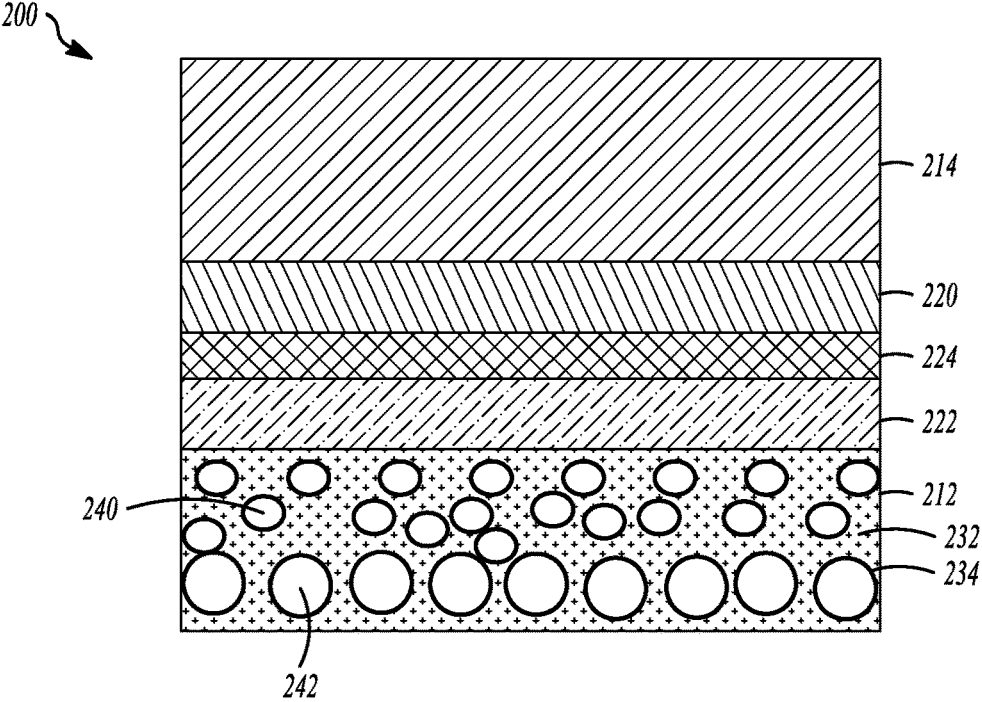
FIG. 5 is a cross-sectional view of the embodiment of the solid-state battery cell of FIG. 3 including another aspect of the anode.
Figure 6:
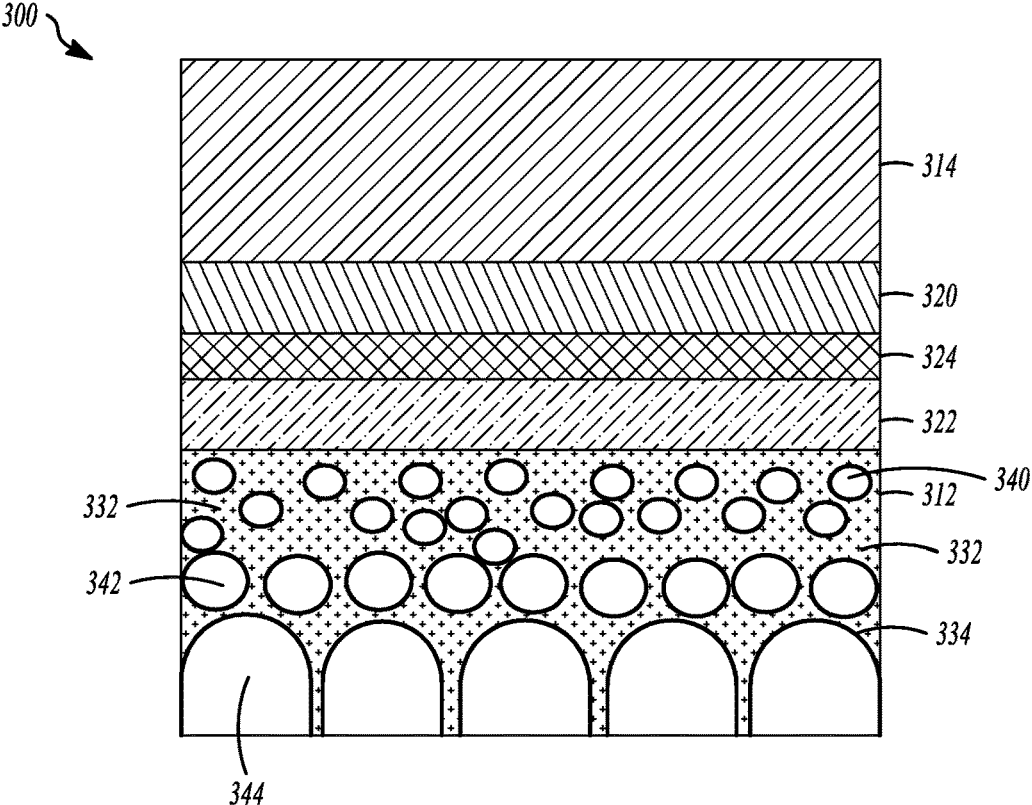
FIG. 6 is a cross-sectional view of the embodiment of the solid-state battery cell of FIG. 3 including yet another aspect of the anode.

The anode 12, 120 in FIGS. 2 and 4 can include different aspects as described with respect to FIGS. 5-8. The solid-state battery cell 200 of FIG. 5 has a cathode 214, a first solid electrolyte layer 220, a second solid electrolyte layer 222, and a second solid electrolyte interphase 224. These layers are the same as corresponding layers in FIG. 4 and will not be described again here. The anode 212, which can also replace anode 12 of FIG. 2, has microspheres of lithium metal that are sized such that a size gradient is formed, the size gradient decreasing in size through the anode 212 toward the second solid electrolyte layer 222. As illustrated in FIG. 5, the anode 212 includes first microspheres 240 having a first diameter and second microspheres 242 having a second diameter larger than the first diameter. The first diameter may be, for example, between 0.5 micron and 2 microns or between 3 microns and 4 microns. The second diameter is larger than the first diameter and may be one of between 3 microns and 4 microns and 5 microns or greater. As illustrated, the diameters decrease moving closer to the electrolyte layers. All microspheres are embedded in an ion and electron conducting oxide-based material 232, with individual microspheres 240, 242 having a first solid electrolyte interface 234. The ion and electron conducting oxide-based material 232 can be a lithium niobium oxide ($LiNbO_3$, for example).

The size gradient illustrated in FIG. 5 is an example. The number of different diameters may be greater than two, such as three different diameters or four different diameters. For example, in FIG. 6, the anode 312 includes first microspheres 340 having a first diameter and second microspheres 342 having a second diameter larger than the first diameter. Also included in anode 312 are third microspheres 344. The third microspheres 344 can be shaped as actual spheres, such as the first and second microspheres 340, 342, or can be spherically shaped at one end as shown, similar to a mound, with the other end configured to contact a current collector. The first diameter may be, for example, between 0.5 micron and 2 microns. The second diameter is larger than the first diameter and may be one of between 3 microns and 4 microns, and the third diameter is the largest and can be 5 microns or greater. As illustrated, the diameters decrease moving closer to the electrolyte layers. All microspheres are embedded in an ion and electron conducting oxide-based material 332, with individual microspheres 340, 342, 344 having a first solid electrolyte interface 334. Note that the first solid electrolyte interphase 334 only forms on the third microspheres 344 where in contact with the ion and electron conducting oxide-based material 332. The ion and electron conducting oxide-based material 332 can be a lithium niobium oxide ($LiNbO_3$, for example).

Figure 9:
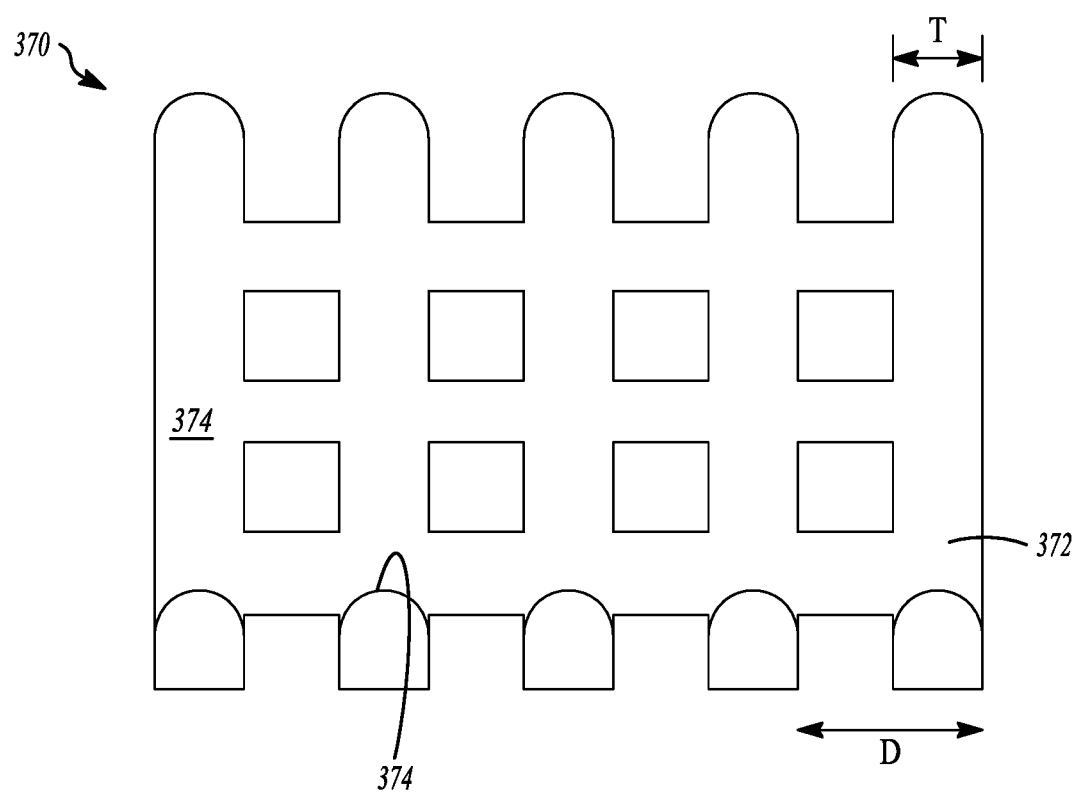
FIG. 9 is a plan perspective view of a mesh-like lithium included in embodiments of the anode as disclosed herein.

As an alternative to the third microspheres 344 or mounds, the anode 312 can include a lithium mesh-like layer 370 wherein a thickness T of the walls 372 creating the mesh-like layer 370 are 5 microns or greater in width. A plan perspective view of the lithium mesh-like layer 370 is illustrated in FIG. 9. It is noted that the cross-section of the mesh-like layer will present the same as the third microspheres 344 in FIG. 6. The surface 374 facing toward the electrolyte layer(s) will be modified such that a majority of the surface is oblique to an in-plane direction D. In yet another alternative, the lithium may be rows of lithium, each row having a modified surface as described herein.

The gradient may also be a concentration gradient of same-sized microspheres, with the concentration of microspheres decreasing through the anode moving toward the electrolyte layers.

Figure 7:
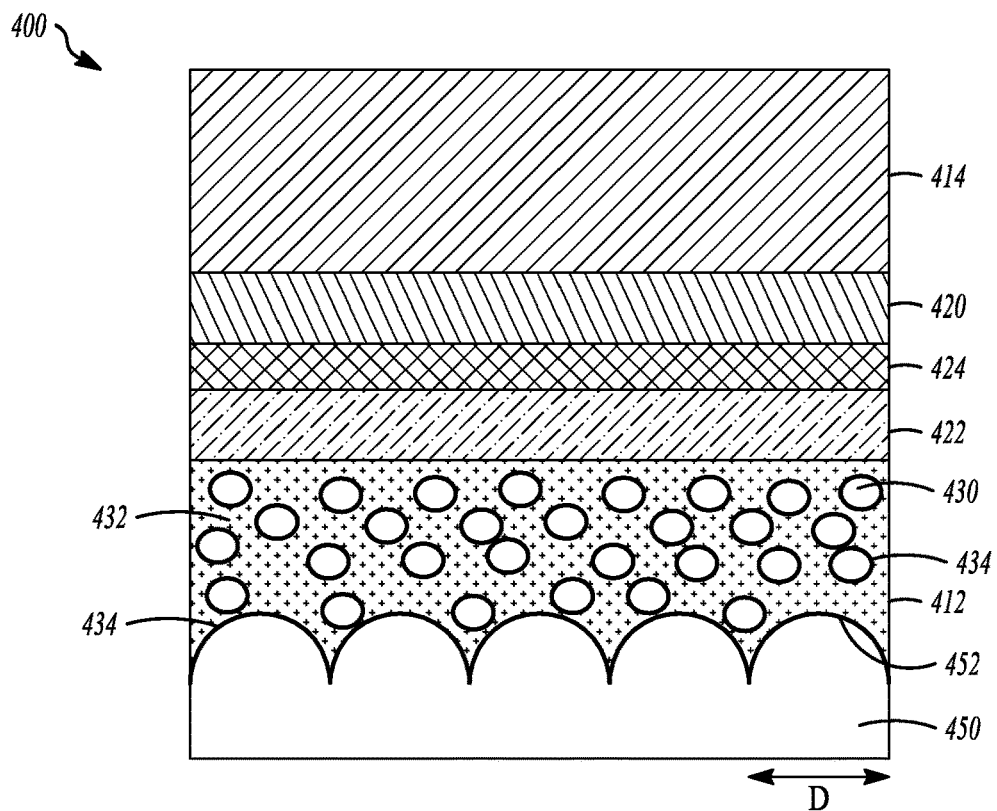
FIG. 7 is a cross-sectional view of the embodiment of the solid-state battery cell of FIG. 3 including yet another aspect of the anode.

The solid-state battery cell 400 of FIG. 7 has a cathode 414, a first solid electrolyte layer 420, a second solid electrolyte layer 422, and a second solid electrolyte interphase 424. These layers are the same as corresponding layers in FIG. 4 and will not be described again here. The anode 412, which can also replace anode 12 of FIG. 2, has microspheres 430 of lithium metal embedded in an ion and electron conducting oxide-based material 432, creating a first solid electrolyte interface 434 around each microsphere 430, as described with respect to FIG. 2. The anode 412 further comprises a lithium metal layer 450 on a surface of the anode 412 opposite the first solid electrolyte layer 420. The lithium metal layer 450 has a modified surface 452 such that a majority of the modified surface 452 is oblique to an in-plane direction D. The lithium metal layer 450 can be a solid layer wherein the modified surface 452 is created with laser ablation, etching or other methods known to those skilled in the art. The lithium metal layer 450 can also have apertures filled with the ion and electron conducting oxide-based material 432, such as, for example, the mesh-like lithium 370 illustrated in FIG. 9, with the surface of the mesh facing into the anode 412 having the modified surface 452. The modified surface 452 assists in reducing or preventing dendrite growth from reaching the first solid electrolyte layer 420 in the same way that the microspheres do. The modified surface 452 is coated with the first solid electrolyte interface 434 as it is in contact with the ion and electron conducting oxide-based material 432.

As illustrated in FIG. 7, the microspheres 430 are positioned between the lithium metal layer 450 and the second solid electrolyte layer 422. Anode 412 can include a size gradient of microspheres as described with respect to FIGS. 5 and 6 between the lithium metal layer 450 and the second solid electrolyte layer 422. Anode 412 can include a concentration gradient of same-sized microspheres as an alternative.

Figure 8:
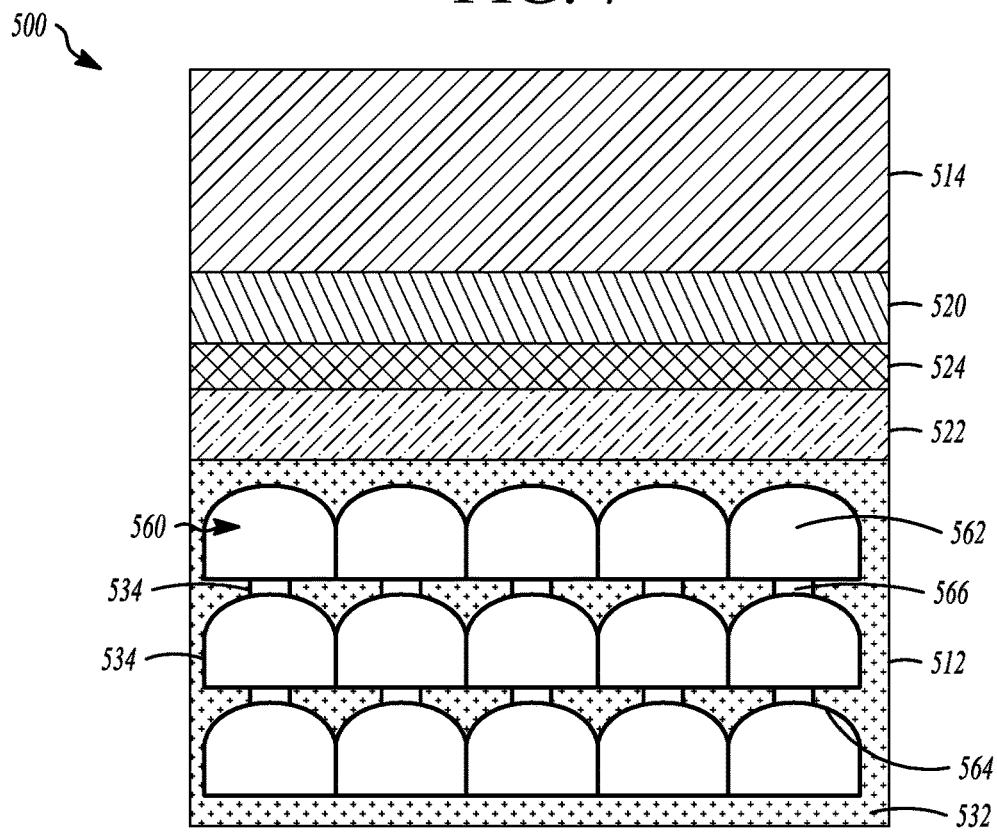
FIG. 8 is a cross-sectional view of the embodiment of the solid-state battery cell of FIG. 3 including yet another aspect of the anode.

The solid-state battery cell 500 of FIG. 8 has a cathode 514, a first solid electrolyte layer 520, a second solid electrolyte layer 522, and a second solid electrolyte interphase 524. These layers are the same as corresponding layers in FIG. 4 and will not be described again here. The anode 512, which can also replace anode 12 of FIG. 2, has a lithium metal scaffold 560 embedded within an ion and electron conducting oxide-based material 532. The lithium metal scaffold 560 is an interconnected, three-dimensional structure. Surfaces of the lithium metal scaffold 560 that are exposed to the ion and electron conducting oxide-based material 532 have the first solid electrolyte interface 534. The lithium metal scaffold 560 can be formed, as a non-limiting example, with multiple layers of mesh-like lithium 562 (three layers shown) having a modified surface 564 as previously described facing toward the electrolyte layers. The mesh-like lithium 562 can be interconnected with smaller islands 566 to provide more surface area on the mesh-like lithium 562 on which the first solid electrolyte interface 534 can form. Other similar structures are contemplated.

The embodiments of the solid-state battery cells disclosed herein may be configured, among other parts, with a thin metal cathode current collector, such as, for instance, 10 μm aluminum foil (or no such current collector if the cathode is conductive enough along its outside surface to which the positive terminal may be connected). The elements of the solid-state battery cell may be, for example, packaged using a thin-film encapsulation of about 3 μm in thickness. A solid-state battery can have one or more solid-state battery cells.

Unless defined otherwise, all technical and scientific terms used herein have the same meanings as commonly understood by one of ordinary skill in the art to which this disclosure belongs. Preferred methods, techniques, devices and materials are described although any methods, techniques, devices, or materials similar or equivalent to those described may be used in the practice or testing of the present disclosure. Structures described herein are to be understood also to refer to functional equivalents of such structures.

It must be noted that as used herein and in the appended claims, the singular forms "a," "an," and "the" include the plural reference unless the context clearly dictates otherwise. Thus, for example, a reference to "an element" is a reference to one or more elements, and includes equivalents thereof known to those skilled in the art.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A solid-state battery cell, comprising:
a cathode;
an anode layer comprising microspheres of lithium metal embedded in a lithium niobium oxide; and
a first solid electrolyte layer comprising a sulfide-based solid electrolyte, the first solid electrolyte layer positioned between the cathode and the anode layer.

2. The solid-state battery cell of claim 1, wherein a diameter of each microsphere of lithium metal is between 0.5 micron and 4 microns.

3. The solid-state battery cell of claim 1, further comprising:
a second solid electrolyte layer comprising an oxide-based solid electrolyte directly between the first solid electrolyte layer and the anode layer, the second solid electrolyte layer having a lower conductivity than the first solid electrolyte layer.

4. The solid-state battery cell of claim 3, wherein the sulfide-based solid electrolyte is $Li_{10}GeP_2S_{12}$ (LGPS) and the oxide-based solid electrolyte is $Li_{6.4}La_3Zr_{1.4}Ta_{0.6}O_{12}$ (LLZTO).

5. The solid-state battery cell of claim 1, wherein the microspheres of lithium metal are sized such that a size gradient is formed, the size gradient decreasing through the anode layer toward the first solid electrolyte layer.

6. The solid-state battery cell of claim 5, wherein the size gradient includes at least: microspheres of lithium metal having a diameter of between 0.5 micron and 2 microns, and microspheres of lithium metal having a diameter of between 3 microns and 4 microns.

7. The solid-state battery cell of claim 1, wherein the anode layer further comprises a lithium metal layer on a surface of the anode layer opposite the first solid electrolyte layer, the lithium metal layer having a modified surface such that a majority of the modified surface is oblique to an in-plane direction and interfacing with the electron conducting oxide-based material in the anode layer.

8. The solid-state battery cell of claim 7, wherein the microspheres are positioned between the lithium metal layer and the first solid electrolyte layer and sized such that a size gradient is formed, the size gradient decreasing through the anode layer toward the first solid electrolyte layer.

9. The solid-state battery cell of claim 8, wherein the size gradient includes microspheres having a diameter of between 0.5 micron and 2 microns, and microspheres having a diameter of between 3 microns and 4 microns.

10. A solid-state battery cell, comprising:
a cathode;
an anode layer comprising microspheres of lithium metal embedded in an ion and electron conducting oxide-based material;
a first solid electrolyte layer comprising a sulfide-based solid electrolyte, the first solid electrolyte layer positioned between the cathode and the anode layer; and
a second solid electrolyte layer comprising an oxide-based solid electrolyte between the first solid electrolyte layer and the anode layer, the second solid electrolyte layer having a lower conductivity than the first solid electrolyte layer.

11. The solid-state battery cell of claim 10, wherein a diameter of each microsphere of lithium metal is between 0.5 micron and 4 microns.

12. The solid-state battery cell of claim 10, wherein the ion and electron conducting oxide-based material is a lithium niobium oxide.

13. The solid-state battery cell of claim 10, wherein the sulfide-based solid electrolyte is $Li_{10}GeP_2S_{12}$ (LGPS) and the oxide-based solid electrolyte is $Li_{6.4}La_3Zr_{1.4}Ta_{0.6}O_{12}$ (LLZTO).

14. The solid-state battery cell of claim 10, wherein the microspheres of lithium metal are sized such that a size gradient is formed, the size gradient decreasing through the anode layer toward the first solid electrolyte layer.

15. The solid-state battery cell of claim 10, wherein the anode layer further comprises a lithium metal layer on a surface of the anode layer opposite the second solid electrolyte layer, the lithium metal layer having a modified surface such that a majority of the modified surface is oblique to an in-plane direction, the modified surface coated with the electron conducting oxide-based material.

16. The solid-state battery cell of claim 15, wherein the microspheres are positioned between the lithium metal layer and the second solid electrolyte layer and sized such that a size gradient is formed, the size gradient decreasing through the anode layer toward the second solid electrolyte layer.

17. The solid-state battery cell of claim 16, wherein the size gradient includes microspheres having a diameter of between 0.5 micron and 2 microns, and microspheres having a diameter of between 3 microns and 4 microns.

* * * * *